United States Patent [19]

Bittihn et al.

[11] Patent Number: 5,047,302
[45] Date of Patent: Sep. 10, 1991

[54] GALVANIC CELL WITH A POLYMER ELECTRODE

[75] Inventors: Rainer Bittihn, Kelkheim; Friedrich Woeffler, Schmitten; Georg Ely, Glashütten, all of Fed. Rep. of Germany

[73] Assignee: Varta Batterie Aktiengesellschaft, Hanover, Fed. Rep. of Germany

[21] Appl. No.: 85,271

[22] Filed: Aug. 10, 1987

Related U.S. Application Data

[63] Continuation of Ser. No. 799,946, Nov. 20, 1985.

[30] Foreign Application Priority Data

Nov. 29, 1984 [DE] Fed. Rep. of Germany ....... 3443455
May 28, 1985 [DE] Fed. Rep. of Germany ....... 3519090

[51] Int. Cl.$^5$ ............................................. H01M 4/60
[52] U.S. Cl. .................................... 429/213; 429/212
[58] Field of Search ............... 429/212, 213, 240, 245, 429/104

[56] References Cited

U.S. PATENT DOCUMENTS

| | | | |
|---|---|---|---|
| 4,117,209 | 9/1978 | Markin et al. | 429/191 |
| 4,440,837 | 4/1984 | Shimotake et al. | 429/221 |
| 4,442,187 | 4/1984 | MacDiarmid et al. | 429/213 |
| 4,497,882 | 2/1985 | Mikkor | 429/163 |
| 4,543,306 | 9/1985 | Dubois et al. | 429/194 |
| 4,559,284 | 12/1985 | Nishimura et al. | 429/213 |
| 4,568,620 | 2/1986 | Wright et al. | 429/104 |

Primary Examiner—John F. Niebling
Assistant Examiner—Steven P. Marquis
Attorney, Agent, or Firm—Weiser & Stapler

[57] ABSTRACT

An aluminum substrate, with its natural oxide film intact, is made suitable for the electrochemical deposition polymerization of the electrode-active organic material, and for further use as an electrolyte holder and a charge eliminator, by providing the aluminum substrate with an electron-conducting coating of Au, Pt, Ni, Cr, Cr-Ni or C. In blank form, following pickling in an alkali, the aluminum substrate can either directly receive the deposit, or can be prepared for this purpose by electrochemical coating with a corrosion-resistant heavy metal.

The aluminum can be used in the form of a netting or expanded metal so as to achieve a particularly firm connection between the metal and the polymer, and so that the resulting mesh cavities can be used to incorporate the amount of electrolyte which is necessary for charging of the polymer electrode. This allows the use of a thinner separator as the electrolyte reservoir, improving the power density of the cell.

19 Claims, 1 Drawing Sheet

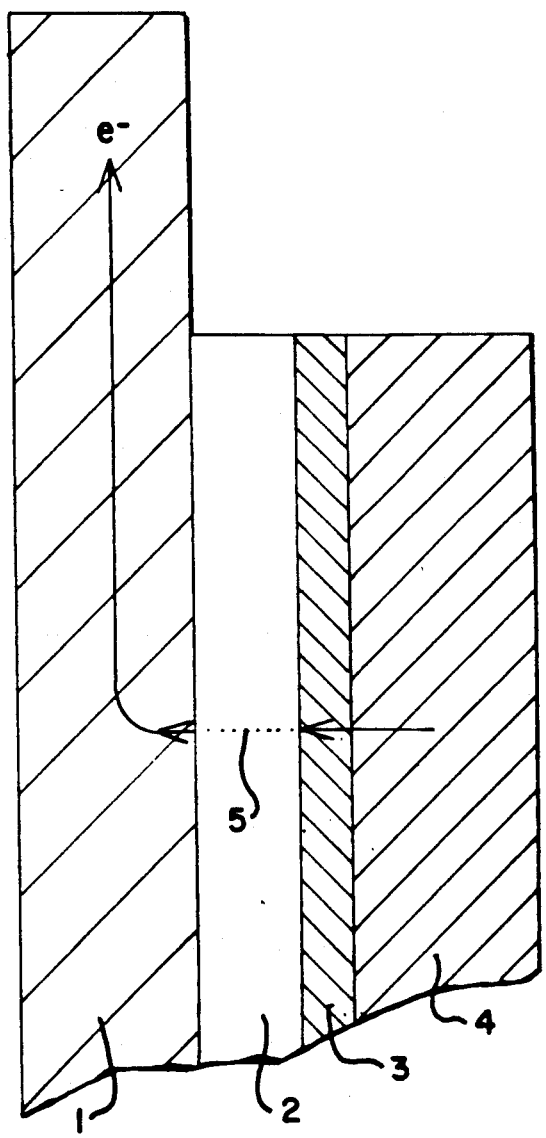

GALVANIC CELL WITH A POLYMER ELECTRODE

This application is a continuation of application Ser. No. 799,946, filed No. 20, 1985.

BACKGROUND OF THE INVENTION

The present invention relates generally to a galvanic cell with at least one electrode whose active material consists of a conductive, organic polymer compound of polyconjugated structure which can be doped with cations or anions, and which has an aluminum charge eliminator.

Electricity-conducting organic polymers are capable of being formed from the corresponding monomers. Depending on the conditions of their formation, the end products are more or less deep-colored crystalline powders or films which form a film-like coating on the wall of the reaction vessel. Such end products can be separated from the liquid reaction medium, generally a suspension of a Ziegler-Natta catalyst in an organic solvent, and then molded and processed in a simple manner after purification.

Despite their good intrinsic conductivity, in using these materials as electrode materials in a polymer cell it has previously been common practice to provide such materials (e.g., a $(CH)_x$ film) with a metal wire (e.g., a Pt wire) to serve as a current collector, and to thus improve the performance capacity of the electrode. Since the connection with the metallic charge eliminator is brought about solely by mechanical pressure, this current collector remains unsatisfactory because of inevitable contact resistance, even in the case of flat charge eliminator materials. This in turn reduces the potential of the loaded electrode.

Efforts have therefore recently been made to provide for a chemical or physical-chemical binding of the polymer material to the metallic charge eliminator, which offers the advantage of having a lower contact resistance. Such measures include, for example, the application of metallic charge eliminators on a layer-shaped polymer structure by vapor deposition or sputtering, or by applying a conductive layer on the polymer surface by photographic techniques. However, in such cases, it has been found that surges in the capacity of the polymer during a charge-discharge cycle can burst the vapor-deposited or printed charge eliminator layer.

Many conducting polymers are formed from monomers by oxidation, in which process radical ions are formed which then undergo dimerization. The dimers are oxidized to a polymer chain via oligomeric intermediate units by adding monomer units. For example, it is known from DE-OS No. 33 26 193 that such a polymer synthesis can be carried out directly on a porous metal body, which serves as the substrate for the deposition and for the further growth of the polymer. The metal body thus becomes both the supportive skeleton and the charge eliminator for the organic electrode material upon its activation by subsequent doping. However, in view of the fact that some polymers are characterized by very high oxidation potentials, relatively corrosion-resistant metals such as nickel, nickel-chromium, copper, copper-nickel, silver or platinum are used as the carrier skeleton.

Conversely, according to JP-OS No. 59-12576 (DE-OS No. 33 24 968), aluminum has been vacuum-deposited on a leaf-shaped polyacetylene material, whereupon the metal-coated polymer is subjected to recoil ion implantation. In this process, because of their high kinetic energy, aluminum atoms penetrate into the conductive polymer and produce a diffuse transition layer between the polymer and the metal substrate, so that a firm connection with low contact resistance is obtained.

The volume-related theoretical energy density of polymer systems is relatively low, a disadvantage which is even more evident when such polymer cells are used in practice. This is because most of the known electrode carriers represent a disproportionately large dead volume as compared with the applied polymer layer, which has a thickness of only a few $\mu m$. Consequently, the volume-specific energy densities of polymer electrodes used in practice are far below their theoretical value.

SUMMARY OF THE INVENTION

It is therefore the principal object of the present invention to provide a substrate wherein polymer layers are directly synthesized on metal surfaces. It is also an object of the present invention to provide a substrate for deposition according to such an anodic process which is just as useful as prior-art metal bodies. It is also an object of the present invention to provide a substrate wherein an aluminum charge eliminator forms the basis for the substrate, due to its low specific gravity. It is also an object of the present invention to provide a substrate wherein the function of a charge eliminator and the function of an electrode carrier are assumed by a material which is less expensive than the precious metals which are conventionally used in this regard.

These and other objects are achieved according to the present invention by providing a galvanic cell having at least one electrode whose active material consists of a conductive organic polymer compound of polyconjugated structure which can be doped with cations or anions, and which has an aluminum charge eliminator, wherein the polymer compound is formed from the corresponding starting monomer by electrochemical deposition on an aluminum substrate. Such electrochemical deposition can proceed either on an aluminum substrate whose natural oxide film has been left intact, but which has been provided with an electron-conducting coating; or on an aluminum substrate whose natural oxide film has been removed, by pickling or the like. In the latter case, the aluminum substrate may be coated with a heavy metal which is resistant to corrosion, if desired.

Thus, two alternative solutions are presented in accordance with the present invention, each of which is the same in terms of desired electrode quality. For further details regarding these alternative solutions, reference is made to the discussion which follows, taken in conjunction with a single drawing which shows a partial sectional view of an electrode structure according to the present invention.

DETAILED DESCRIPTION OF PREFERRED EMBODIMENTS

The primary advantage shared by both solutions according to the present invention is that the material of the charge eliminator (aluminum) is characterized by very high weight-specific and volume-specific conductivity. Consequently, at least when such materials are used in the form of thin films (e.g. a film thickness of only a few $\mu m$), this permits the polymer-film-tocharge-eliminator-material-volume ratio to be considerably greater than 1. Thus, an order of magnitude which is characteristic of polymer films is reached. Consequently, the energy density of the polymer battery can be kept within acceptable limits.

Although conventionally available aluminum films of the desired quality have sufficient mechanical stability, they are traditionally covered with a current-insulating natural oxide film which would ordinarily prevent the use of such films as a substrate for the anodic polymerization of organic substances. However, an oxidized aluminum surface is also characterized by an enormous stability, serving to protect the base metal from further oxidation.

In accordance with the present invention, it has surprisingly been found that by coating an aluminum substrate with an oxidized surface with an electron-conducting material, the substrate is able to receive the deposition coating in the polymerization process, and assumes the function of the electrode carrier and the electrode charge eliminator during subsequent operation of the battery, without being susceptible to corrosion.

Numerous metals are suitable as electron-conducting materials for the coating; however, precious metals such as gold or platinum, as well as nickel, chromium or chromium-nickel alloys are especially suitable. The metals can be applied on the aluminum substrate by vapor deposition or by sputtering. Another suitable method involves the spraying or lacquering of the aluminum substrate with a suspension which has been prepared from suitable metal powders in a solvent, using appropriate stabilizers. Also particularly suitable is a coating of carbon either in the form of graphite or carbon black, which is applied either by vapor deposition or preferably by spraying or lacquering in suspended form. A similar technique can be used in the case of conductive lacquers.

After this pretreatment, the direct electrochemical polymerization of the active organic electrode material from a solution of the monomer in a neutral organic solvent can be satisfactorily performed. The adhesion of the polymer layer, and the conductivity of the oxide film on the aluminum, can be increased by subjecting the precious metal or heavy metal coating applied according to one of the above described methods to tempering at 200-300° C. for several hours prior to the polymer coating.

Surprisingly, the process of the present invention creates conditions which make an electrochemical process possible precisely when the oxide-coated aluminum substrate is naturally protected from corrosion on the electrolyte-facing surface of the oxide layer. Since the oxide layer, and especially the metal film which is spread over the oxide layer, are extraordinarily thin, it can be assumed by way of explanation that the electron flux necessary for anodic polymerization is brought about by a tunnel effect between the applied metal layer and the metallic "aluminum core", via the oxide layer.

This hypothesis is shown with reference to the accompanying FIGURE, which schematically shows a polymer electrode according to the present invention which comprises, in sequence, an aluminum metal layer 1, a natural oxide covering 2, an electron-conducting coating 3 (precious metal or carbon), and an electrochemically deposited polymer 4. After a certain potential gradient has been reached between the layers 1 and 3, electrons are able to overcome the nonconducting oxide coating 2 by creating a tunnel 5 which permits the flow of electrons to the aluminum charge eliminator 1.

An alternative electrode design in accordance with the present invention is also based on an aluminum charge eliminator, which can be in the form of a film, or more preferably, a netting or an expanded metal. The base metal as originally supplied is again protected by its natural oxide film which, being a non-conductor, would again prevent the aluminum from being used as a conductive carrier for an electrochemically active material without pretreatment. According to the present invention, this pretreatment involves the removal of the natural oxide film by pickling. Potassium hydroxide or sodium hydroxide are preferably used as the pickling liquid. After thorough rinsing, the polymer is electrochemically applied on the bare surface of the aluminum substrate. If desired, a heavy metal coating can first be applied galvanically, without allowing the aluminum charge eliminator to dry.

The pretreated charge eliminator is then able to establish a firm connection with the active polymer. If desired, the charge eliminator can also be cladded prior to polymerization (e.g. with chromium) to eliminate pores. The direct electrochemical polymerization of the electrode material from a solution of the monomer in a solvent, which is preferably identical with that of the cell electrolyte, is then satisfactorily carried out with the charge eliminator prepared according to the present invention serving as the substrate for the deposition.

While the foregoing is a relatively "dirty" manufacturing process, the connection achieved between the metal surface and the polymer deposit is so firm that it far exceeds the quality of a mere mechanical contact. For example, in an experimental cell comprising a positive polypyrrole electrode formed by polymerization of the monomer on a pickled aluminum substrate, a negative Li electrode, and a $LiClO_4$-propylene carbonate electrolyte, neither an increase in the internal resistance nor the taking up of Al ions by the electrolyte was observed during cycling of the cell. Thus, there is no noteworthy risk of corrosion for the charge eliminator.

In connection with this alternative electrode design, it is particularly preferred that the blank (pickled) aluminum surface be coated with a corrosion-resistant heavy metal prior to the application of the polymer, so that the polymer is deposited only on this heavy metal coating. However, in protecting the aluminum from corrosion, it is not necessary to eliminate the possibility of the formation of oxidic tarnish layers on the heavy metal coating, since these tarnish layers themselves possess sufficient electron conductivity.

Chromium and chromium-nickel alloys are especially advantageous heavy metals for the purposes of the present invention. Precious metals are also suitable, especially platinum, but their use is limited by their cost. The organic compounds which are preferred for the polymer formation are pyrrole, thiophene, furan, aniline and p-phenylene sulfide.

To improve adhesion of the polymer on the substrate, it is advantageous to use aluminum nettings or expanded aluminum in place of the above described films. In such case, the polymer film surrounds the webs of the netting or the expanded metal in an interlocking fashion, preventing detachment of the polymer film from the carrier.

In such case, mesh cavities are inevitably left between the charge eliminator and the electrode materials. These cavities form electrolyte reservoirs which can be advantageously used in conjunction with the present invention as follows. Polymer electrodes require a certain amount of electrolyte for charging. By distributing electrolyte within the mesh in the immediate vicinity of the electrode, an amount of electrolyte is kept available to the electrode. It is therefore expedient to dimension the mesh at the time of manufacture of the aluminum netting or expanded metal so that the stoichiometric quantity of electrolyte necessary for operation of the electrode exactly fills the resulting cavities. Such an electrode design contributes materially to the increase of the power density of a polymer cell because it integrates at least part of the electrolyte as the active component. This electrolyte could otherwise only be accommodated in the porous separator. Consequently, since the separator becomes an inactive component, the separator can be reduced in thickness, with a corresponding reduction in resistance.

Polymer electrodes clad with heavy metals on an aluminum carrier according to the present invention have the special advantage of being insensitive to traces of moisture in the organic electrolyte, which can only be kept within tolerable limits at considerable expense.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A galvanic cell having at least one electrode with an active material comprised of a conductive organic polymer compound of polyconjugated structure doped with cations or anions, and which comprises an aluminum substrate covered with a natural oxide film and an electron-conducting coating covering the natural oxide film, wherein the polymer compound is formed from the corresponding starting monomer by electrochemical deposition on the electron-conducting coating of the aluminum substrate.

2. The galvanic cell of claim 1 wherein the electron-conducting coating is a metal selected from the group consisting of Au, Pt, Ni, Cr or a Cr-Ni alloy, and is applied on the oxide-coated aluminum substrate by vapor deposition, sputtering, or by spraying or lacquering from a suspension prepared with a solvent.

3. The galvanic cell of claim 1 wherein the electron-conducting coating is carbon in the form of graphite or carbon black, and is applied on the oxide-coated aluminum substrate by vapor deposition or spraying or lacquering from a suspension prepared with a solvent.

4. The galvanic cell of claim 1 wherein the starting monomer of the electrode-active polymer compound is selected from the group consisting of pyrrole, thiophene, furan, aniline and p-phenylene sulfide.

5. The galvanic cell of claim 1 wherein the aluminum substrate is a foil material, an aluminum netting, or expanded aluminum metal.

6. The galvanic cell of claim 5 wherein the aluminum substrate is an aluminum netting or expanded aluminum metal, and wherein the netting or expanded metal defines mesh cavities having a volume which is adjusted to the volume of electrolyte necessary for charging the polymer electrode.

7. A galvanic cell having at least one electrode with an active material comprised of a conductive organic polymer compound of polyconjugated structure doped with cations or anions, wherein the polymer compound is formed from the corresponding starting monomer by electrochemical deposition on an oxide-free aluminum substrate.

8. The galvanic cell of claim 7 wherein the substrate is initially covered with a natural oxide film, and wherein the natural oxide film is removed form the substrate by pickling prior to the application of said polymer compound.

9. The galvanic cell of claim 8 wherein the substrate is coated with a heavy metal which is resistant to corrosion after the natural oxide film is removed form said substrate.

10. The galvanic cell of claim 9 wherein the corroion-resistant heavy metal is chromium, a chromium-ickel alloy or a precious metal.

11. The galvanic cell of claim 7 wherein the aluminum substrate is a foil material, an aluminum netting, or expanded aluminum metal.

12. The galvanic cell of claim 11 wherein the aluminum substrate is an aluminum netting or expanded aluminum metal, and wherein the netting or expanded metal defines mesh cavities having a volume which is adjusted to the volume of electrolyte necessary for charging the polymer electrode.

13. The galvanic cell of claim 7 wherein the oxide-free substrate is provided with a heavy metal coating.

14. The galvanic cell of claim 7 wherein the starting monomer of the electrode-active polymer compound is selected from the group consisting of pyrrole, thiophene, furan, aniline and p-phenylene sulfide.

15. A process for preparing an electrode for a galvanic cell, wherein said electrode has an active material comprised of a conductive organic polymer compound of polyconjugated structure for doping with cations or anions, and an aluminum charge eliminator, and wherein said process comprises the steps of:
   providing an aluminum substrate having a natural oxide film thereon;
   pickling said substrate with an alkali, whereby said substrate is free of said oxide film; and
   electrochemically depositing said organic polymer compound on the surface of said substrate, from the corresponding starting monomer.

16. The process of claim 15 which further comprises the step of galvanically depositing a coating comprised of a corrosion-resistant heavy metal on the surface of said substrate, after said pickling and before said depositing.

17. A process for preparing an electrode for a galvanic cell, wherein said electrode has an active material comprised of a conductive organic polymer compound of polyconjugated structure for doping with cations or anions, and an aluminum charge eliminator, and wherein said process comprises the steps of:
   providing an aluminum substrate having a natural oxide film thereon;
   applying an electron-conducting on said substrate; and
   electrochemically depositing said organic polymer compound on said coating, from the corresponding starting monomer.

18. An electrode having an active material comprised of a conductive organic polymer compound of polyconjugated structure for doping with cations or anions, and which comprises an aluminum substrate covered with a natural oxide film and an electronconducting coating covering the natural oxide film, wherein the polymer compound is formed from the corresponding starting monomer by electrochemical deposition on the electron-conducting coating of the aluminum substrate.

19. An electrode having an active material comprised of a conductive organic polymer compound of polyconjugated structure for doping with cations or anions, wherein the polymer compound is formed from the corresponding starting monomer by electrochemical deposition on an oxide-free aluminum substrate.

* * * * *